United States Patent
Yanagawa et al.

(10) Patent No.: US 6,697,398 B2
(45) Date of Patent: Feb. 24, 2004

(54) LASER LIGHT INTENSITY CONTROLLER

(75) Inventors: Naoharu Yanagawa, Tokorozawa (JP); Fumihiko Sano, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 71 days.

(21) Appl. No.: 09/968,906

(22) Filed: Oct. 3, 2001

(65) Prior Publication Data

US 2002/0044576 A1 Apr. 18, 2002

(30) Foreign Application Priority Data

Oct. 4, 2000 (JP) .................................... 2000-304482
Dec. 18, 2000 (JP) .................................... 2000-384373

(51) Int. Cl.⁷ ............................................... H01S 3/10
(52) U.S. Cl. ............................................. 372/29.021
(58) Field of Search ........................ 372/29.02, 29.021, 372/29.011

(56) References Cited

U.S. PATENT DOCUMENTS 4,774,615 A * 9/1988 Revelli et al. ............... 360/114
6,134,253 A * 10/2000 Munks et al. ................. 372/38
6,144,025 A * 11/2000 Tei et al. ..................... 250/226

* cited by examiner

*Primary Examiner*—James Davie
(74) *Attorney, Agent, or Firm*—Sughrue Mion, PLLC

(57) ABSTRACT

A laser light intensity controller includes a polarizing beam splitter for passing most of one of an x-direction polarization component perpendicular to a direction in which a laser beam emitted from a light source travels and a y-direction polarization component parallel with the traveling direction and for reflecting a little portion of the one polarization component as monitoring light, and a photodetector for receiving the reflected monitoring light to generate a light intensity signal. The controller drives the light source in accordance with the light intensity signal. An optical element which passes passing only the one polarization component is installed between the light source and the polarizing beam splitter.

15 Claims, 5 Drawing Sheets

US 6,697,398 B2

LASER LIGHT INTENSITY CONTROLLER

BACKGROUND OF THE INVENTION

1. Field of the Invention

The present invention relates to a laser light intensity controller for an optical apparatus.

2. Description of the Related Background Art

An optical pickup apparatus, which is used for reading information from an optical disc or writing information into an optical disc, is provided with a laser light intensity controller which monitors a portion of a laser beam emitted from a light source to irradiate the disc with the laser beam with an appropriate light intensity.

In the laser light intensity controller, for preventing a decrease in the light intensity of a laser beam irradiated to a disc caused by the rotation of a polarization plane of the laser beam, due to a change in temperature which affects optical parts such as a light source, a portion of the laser beam emitted from the light source, if the laser beam irradiated to the disc is the P-polarization component, is separated by a polarizing beam splitter. The separated laser beam is further separated by another polarizing beam splitter, and received by a front monitor which serves as a light receiving means, to drive the light source in response to an output signal of the front monitor.

However, the conventional laser light intensity controller has a problem in that many optical parts are required, so that its optical system is complicated. In the case of rotating the polarization plane of the laser beam, if the laser beam to be irradiated onto the disc is a P-polarization component, not only the P-polarization component but also a slight amount of the S-polarization component reaches the optical disc. The S-polarization component becomes noise, and the noise makes the read and write operations unstable.

SUMMARY OF THE INVENTION

An object of the present invention is to provide a laser light intensity controller which can stably control the optical intensity of a laser beam emitted from a light source in an optical pickup apparatus with a simple configuration, even if the plane of polarization of the laser beam rotates, and which can stably perform read and write operations for a recording medium.

According to the present invention, there is provided a laser light intensity controller for controlling a light intensity of a laser beam emitted from a light source of an optical apparatus, comprising: a polarization separating device for passing therethrough most of one of an x-direction polarization component perpendicular to a direction in which a laser beam emitted from the light source travels and a y-direction polarization component parallel with the traveling direction and for reflecting a little portion of the one polarization component as monitoring light; a light receiving device for receiving the monitoring light reflected by the polarization separating device to generate a light intensity signal indicative of the received light intensity; a driving device for driving the light source in accordance with the light intensity signal; and an optical element arranged between the light source and the polarization separating device for passing only the one polarization component.

DETAILED DESCRIPTION OF THE PREFERRED EMBODIMENTS

The embodiments of the present invention will now be described in detail with reference to the accompanying drawings.

Figure 1:
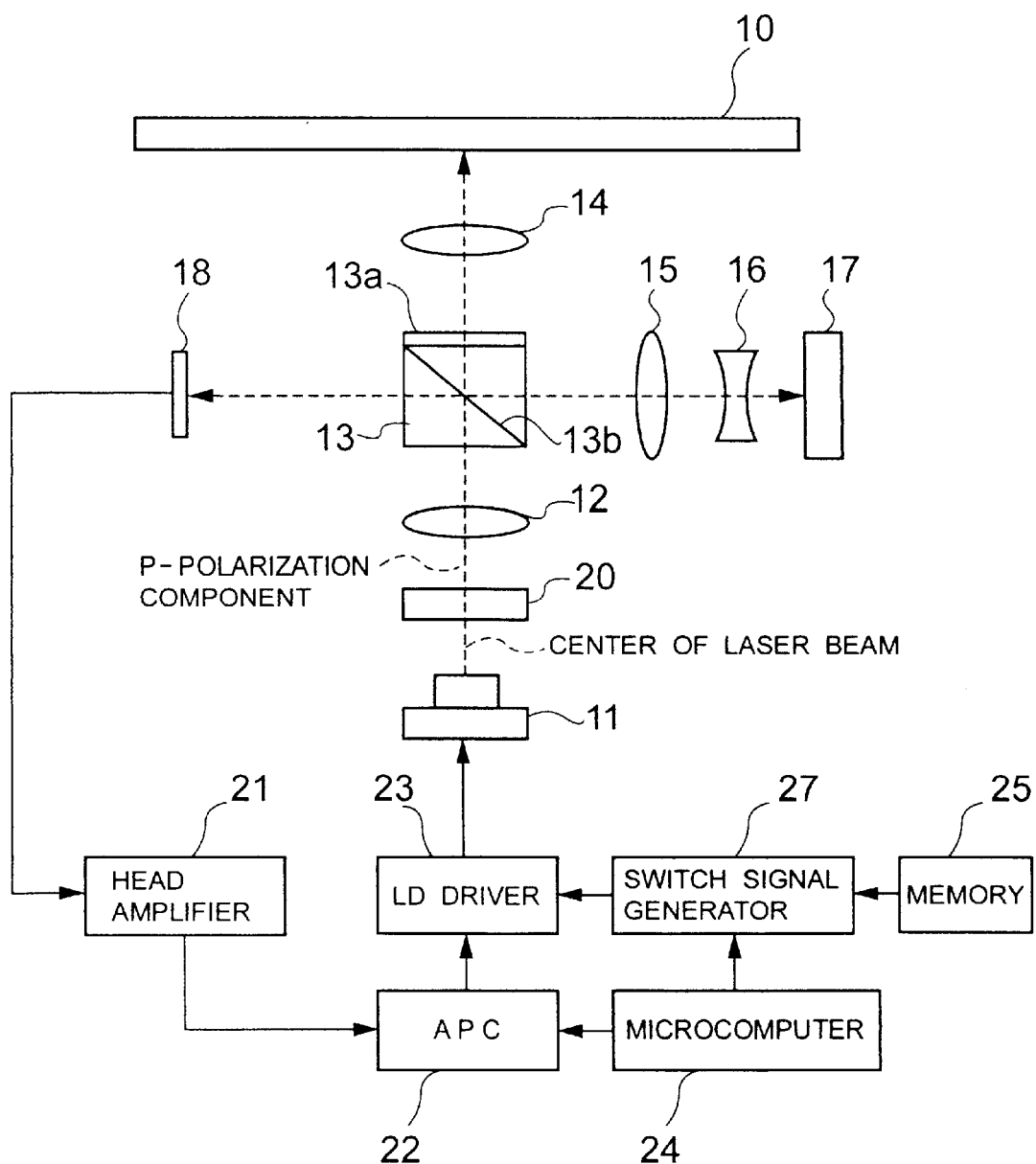
FIG. 1 is a diagram illustrating an embodiment of the present invention.

FIG. 1 illustrates the configuration of an optical pickup apparatus to which a laser light intensity controller according to the present invention is applied. The illustrated optical pickup apparatus includes a semiconductor laser device 11, a collimator lens 12, a PBS (polarizing beam splitter) 13, an objective lens 14, a condenser lens 15, a multi-lens 16, a photodetector 17, a front monitor 18, and a polarizing plate 20. The illustrated optical pickup apparatus writes information into an optical disc 10 or reads information recorded on the optical disc 10 with a laser beam emitted by the semiconductor laser device 11. The optical disc 10 may be, for example, DVD, DVD-R, DVD-RAM, DVD-RW, CD, and CD-R.

The semiconductor laser device 11 may be such one that emits two laser beams at different wavelengths from each other. For example, the semiconductor laser device 11 may be driven by an LD driver 23 to selectively emit a laser beam for DVD at wavelength of 650 nm and a laser beam for CD at wavelength of 780 nm.

The laser beam emitted from the semiconductor laser element 11 reaches the polarizing plate 20 first. The polarizing plate 20 passes therethrough a P-polarization component (electric field component parallel with an incident plane, that is, an x-direction polarization component) only of the laser beam, and blocks passage of an the S-polarization component of the laser beam (electric field component perpendicular to the incident plane, that is, a y-direction polarization component).

The P-polarization component of the laser beam passed through the polarizing plate 20 reaches the PBS 13 having a polarizing plate as collimated light through the collimator lens 12. The PBS 13 is disposed such that the polarizing plate 13a of the PBS 13 is positioned on the opposite side to the semiconductor laser device 11, i.e., on the same side as the optical disc 10. The PBS 13 passes therethrough most (for example, 90%) of the P-polarization component, and reflects a little portion (for example, 10%) of the P-polarization component on a polarization separating plane 13b. If an S-polarization component of the laser beam is incident on the PBS 13, the PBS 13 passes therethrough a little portion (for example, 10%) of the S-polarization component, and reflects most (for example, 90%) of the S-polarization component on the polarization separating plane 13b. With this operation, the laser beam that enters the polarizing plate 20 is separated into two portions: the largest portion is used for the operation of reading from a disc and the remaining portion is used for monitoring the laser power. The laser beam reflected by the PBS 13 travels in a direction substantially perpendicular to a direction in which the laser beam passes through the PBS 13. The polarizing plate 13a converts the laser beam which has passed the PBS 13 from linearly polarized light to circularly polarized light.

The laser beam which has passed the PBS 13 having the polarizing plate 13a reaches the disc 10 through the objective lens 14, and is reflected by a recording surface of the disc 10. The laser beam reflected by the recording surface of the disc 10 returns to the PBS 13 through the objective lens 14 and the polarizing plate 13a. The polarizing plate 13a converts the reflected laser beam from circularly polarized light to linearly polarized light. The PBS 13 reflects the returned laser beam on the polarization separating plane 13b, such that the reflected laser beam reaches a light receiving surface of the photodetector 17 through the condenser lens 15 and the multi-lens 16.

The front monitor 18 is provided in a direction in which the laser beam reflected by the PBS 13 travels. The front monitor 18 includes a photodiode which has a surface covered with a transparent acrylic plate. An incident plane of the front monitor 18 is perpendicular to the direction in which the reflected laser beam travels. The front monitor 18 generates an electric signal corresponding to the light intensity of the laser beam incident thereon, i.e., a front monitor signal.

The front monitor 18 is connected to an APC (automatic power controller) 22 through a head amplifier 21. The APC 22 controls a drive signal level by the LD driver 23 such that the level of a front monitor signal amplified by the head amplifier 21 is equal to a reference level. The reference level takes different values when data is read from the disc 10 and when data is written into the disc 10. The value of the reference level is specified by a microcomputer 24.

For writing, recording data is read from a memory 25 and supplied to a switch signal generator 27. The switch signal generator 27 controls driving power of the LD driver 23 in accordance with the recording data. Specifically, the switch signal generator 27 forces the LD driver 23 to switch the driving power to a high level at a portion of the disc 10 on which a pit is formed, and to switch the driving power to a low level (driving power for reading) at a portion of the disc 10 on which no pit is formed.

In the optical pickup apparatus configured as described above, a drive signal generated by the LD driver 23 is supplied to the semiconductor laser device 11 which emits a laser beam having an intensity in accordance with the drive signal level. The only P-polarization component of the emitted laser beam passes through the polarizing plate 20. An S-polarization component of the emitted laser beam is cut off by the polarizing plate 20.

The P-polarization component laser beam that passes through the polarizing plate 20 is converted to parallel light by the collimator lens 12, and then supplied to the PBS 13. A little portion of the P-polarization component is reflected by the PBS 13, and directed to the front monitor 18. Sensitive to the P-polarization component incident on the front monitor 18, the front monitor 18 generates a front monitor signal in accordance with the light intensity of the P-polarization component. The front monitor signal is amplified by the head amplifier 21, and then supplied to the APC 22.

The APC 22 generates a control signal such that the front monitor signal is equal to a reference level. Specifically, the control signal increases the level of the drive signal supplied to the semiconductor laser device 11 by the LD driver 23 when the front monitor signal is lower than the reference level, and decreases the level of the drive signal supplied to the semiconductor laser device 11 by the LD driver 23 when the front monitor signal is higher than the reference level. As a result, even if the plane of polarization of the laser beam rotates, it is possible to maintain the P-polarization component of the laser beam reaching the disc 10 through the PBS 13 at a desired intensity.

The S-polarization component can be removed by the polarizing plate 20 even if rotation of the plane of polarization of the laser beam occurs. It is possible to irradiate a P-polarization component only onto the optical disc 10. Therefore, write and read operations for the disc 10 can be stably performed.

Although the polarizing plate 20 is installed between the semiconductor laser element 11 and the collimator lens 12 in the above-mentioned embodiment, it is also possible to install the polarizing plate 20 between the collimator lens 12 and the PBS 13.

Figure 2:
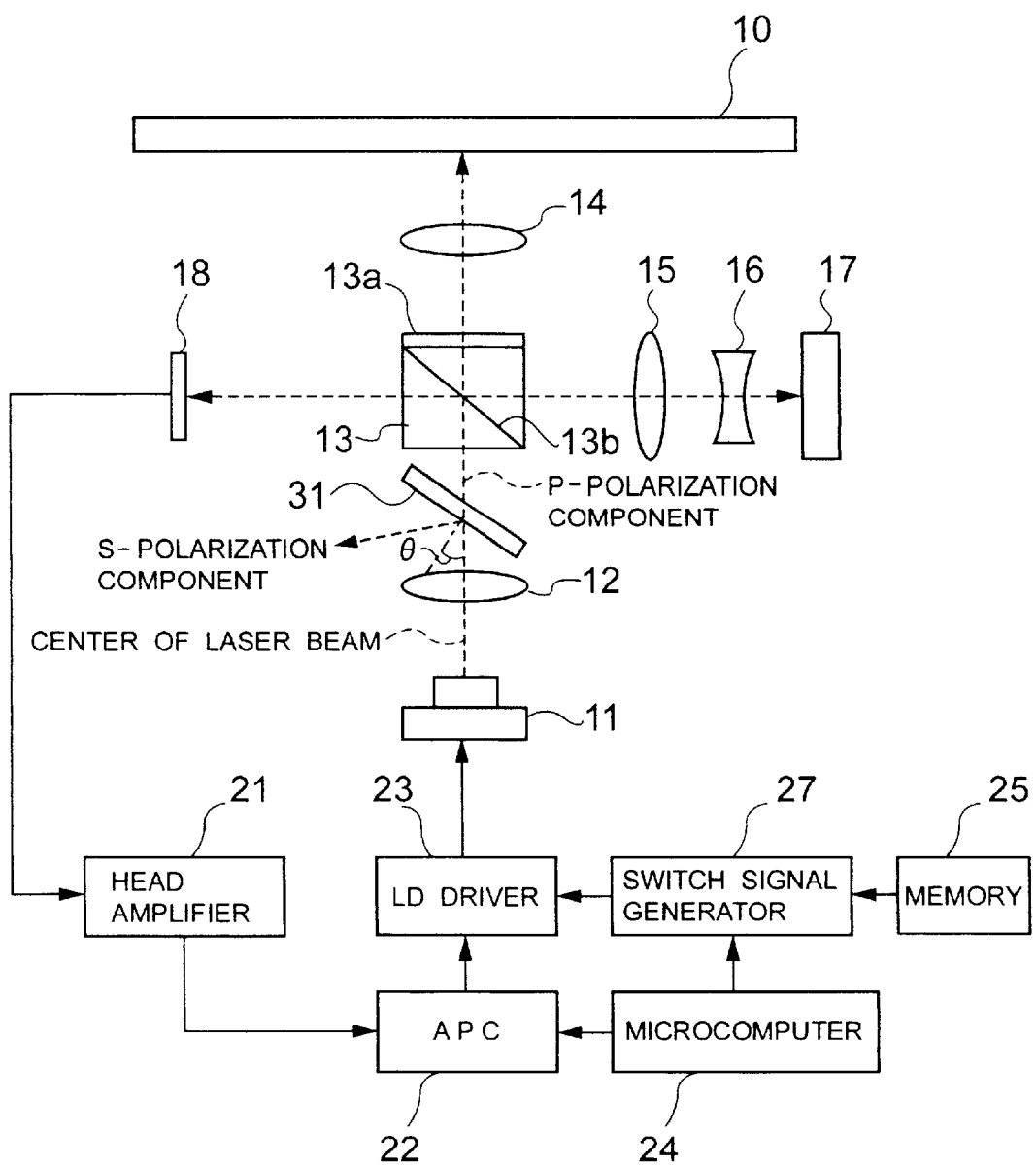
FIG. 2 is a diagram illustrating another embodiment of the present invention.

FIG. 2 shows another embodiment of the present invention. In the optical pickup apparatus of this embodiment, a flat glass plate 31 is installed between the collimator lens 12 and the PBS 13 instead of the polarizing plate 20 in the optical pickup apparatus in FIG. 1. An incident plane of the flat glass plate 31 is not vertical to the direction of the reflected laser beam by the PBS 13 but is inclined. The angle θ of inclination is Brewster's angle, at which a P-polarization component of a laser beam passes through the flat glass plate 31 and an S-polarization component is reflected by the flat glass plate 31. The remaining configuration is similar to that of the optical pickup apparatus shown in FIG. 1.

In an optical pickup apparatus having the configuration in FIG. 2, a drive signal from the LD driver 23 is supplied to the semiconductor laser element 11, and a laser beam with an intensity in response to the level of the drive signal is emitted from the semiconductor laser element 11. The emitted laser beam is converted into parallel light by the collimator lens 12, and reaches the flat glass plate 31. At the flat glass plate 31, a P-polarization component of the laser beam passes through the flat glass plate 31, while an S-polarization component is reflected by the flat glass plate 31, as described above. Consequently, the P-polarization component of the laser beam is supplied from the flat glass plate 31 to the PBS 13.

A little portion of the P-polarization component is reflected by the PBS 13, and goes to the front monitor 18. At the front monitor 18, a front monitor signal is generated in response to the optical intensity of the P-polarization component of the incident laser beam. The front monitor signal is amplified by the head amplifier 21, and then supplied to the APC 22. The operation of the APC 22 is the same as in the above-mentioned apparatus in FIG. 1. Therefore, its description is omitted here.

In the optical pickup apparatus having the configuration in FIG. 2, the P-polarization component of the laser beam passing through the PBS 13 and reaching the disc 10 can be maintained at a desired intensity even if the plane of polarization of the laser beam rotates. In addition, the S-polarization component can be removed from the laser beam directing to the disc 10 by reflecting the S-polarization component at the flat glass plate 31 even if rotation of the plane of polarization of the laser beam occurs. Accordingly, it is possible to irradiate the P-polarization component only onto the disc 10. Therefore, write and read operations to and from the disc 10 can be stably performed.

Figure 3:
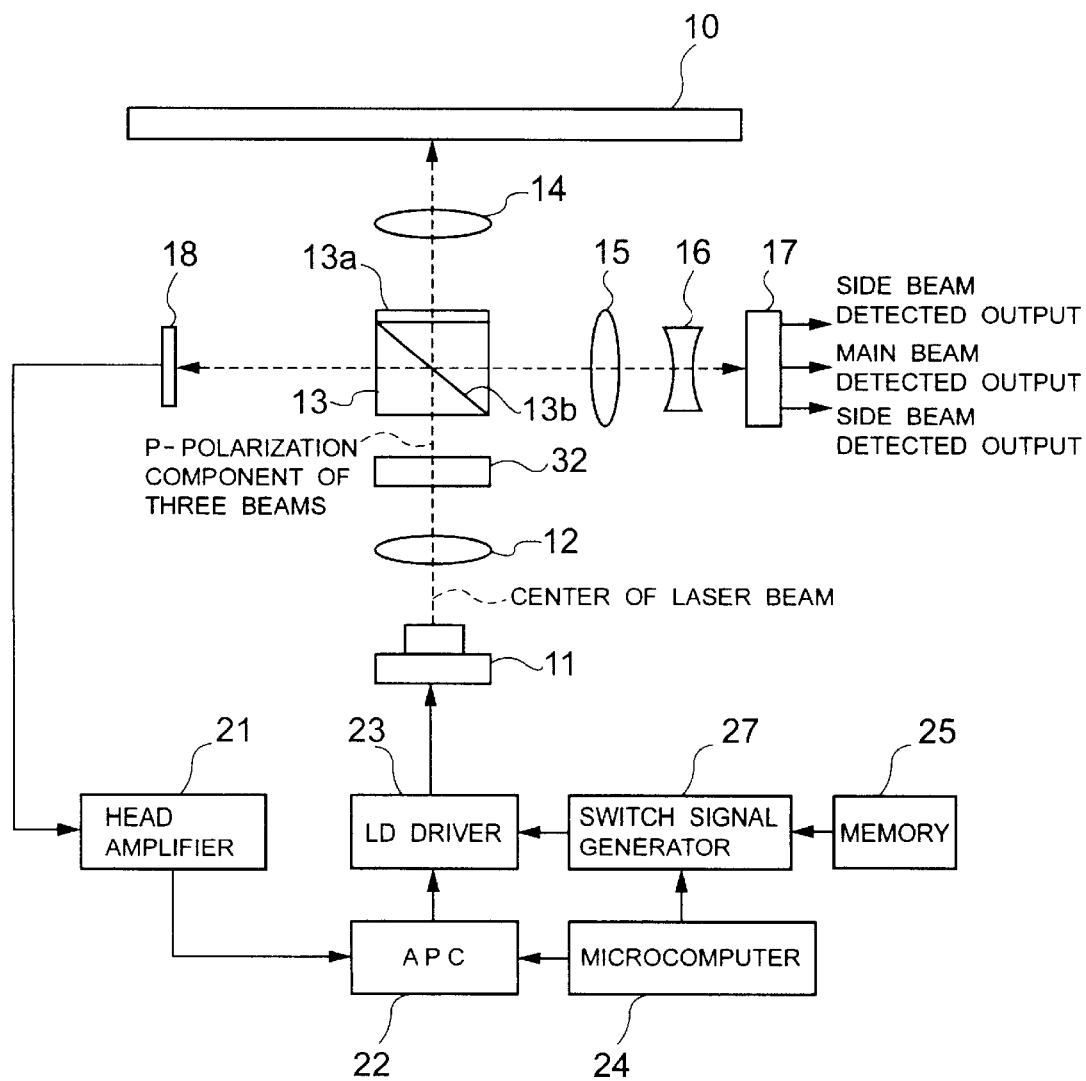
FIG. 3 is a diagram illustrating another embodiment of the present invention.

FIG. 3 shows still another embodiment of the present invention. The optical pickup apparatus of this embodiment includes a polarizing plate grating 32 between the collimator lens 12 and the PBS 13, for performing tracking servo control by the three-beam method. The polarizing plate grating 32 allows only a P-polarization component of a laser beam to pass and blocks passage of an S-polarization component. The polarizing plate grating 32 also separates a laser beam into a plurality of luminous fluxes (zero order light, ±one order lights). The zero order light is the main beam for an RF signal (read signal) and for focus servo control. The ±one order lights are side beams for tracking servo control by the three-beam method.

An optical detector 17 includes a main beam detector (not shown) with side beam detectors on both sides of the main beam detector. The remaining configuration is similar to that of the optical pickup apparatus shown in FIG. 1, except that this apparatus does not include a polarizing plate 20.

In the optical pickup apparatus having the configuration in FIG. 3, a drive signal from the LD driver 23 is supplied to the semiconductor laser element 11, and a laser beam with an intensity in response to the level of the drive signal is emitted from the semiconductor laser element 11. The emitted laser beam is converted into parallel light by the collimator lens 12, and then reaches the polarizing plate grating 32. Only a P-polarization component of the laser beam passes through the polarizing plate grating 32.

The polarizing plate grating 32 further separates the P-polarization component of the laser beam into three beams (a main beam for an RF signal and for focus servo control, and two side beams for tracking servo control). The P-polarization component of the laser beam separated into three beams is supplied from the polarizing plate grating 32 to the PBS 13 in this manner. A little portion of the P-polarization component is reflected by the PBS 13 and directs to the front monitor 18. The front monitor 18 generates a front monitor signal in response to the optical intensity of the P-polarization component of the laser beam that enters the front monitor 18. The front monitor signal is amplified by the head amplifier 21, and then supplied to the APC 22. The operation of the APC 22 is the same in the apparatus in FIG. 1. Therefore, its description is omitted here.

Most of the laser beam which passes through the PBS 13 containing the polarizing plate 13a reaches the disc 10 via the objective lens 14 to form three spots on a recording surface of the disc 10, and is reflected by the recording surface. The three laser beams reflected by the recording surface of the disc 10 go back to the PBS 13 via the objective lens 14 and the polarizing plate 13a. The polarizing plate 13a converts the circular polarization of each of the reflected laser beams to linear polarization. The PBS 13 reflects the returned laser beams with the polarization separating plane 13b. The reflected laser beams reach the light receiving planes of each of the main beam detector and the side beam detectors of the optical detector 17 respectively via the condenser lens 15 and the multi-lens 16.

In the optical pickup apparatus having the configuration in FIG. 3, the P-polarization component of the laser beam passing through the PBS 13 and reaching the disc 10 can also be maintained at the desirable intensity even if the plane of polarization of the laser beam rotates. In addition, the S-polarization component can be removed by the polarizing plate grating 32 even if rotation of the plane of polarization of the laser beam occurs. Accordingly, it is possible to irradiate the P-polarization component only onto the disc 10. Therefore, write and read operations to and from the disc 10 can be stably performed.

Figure 4:
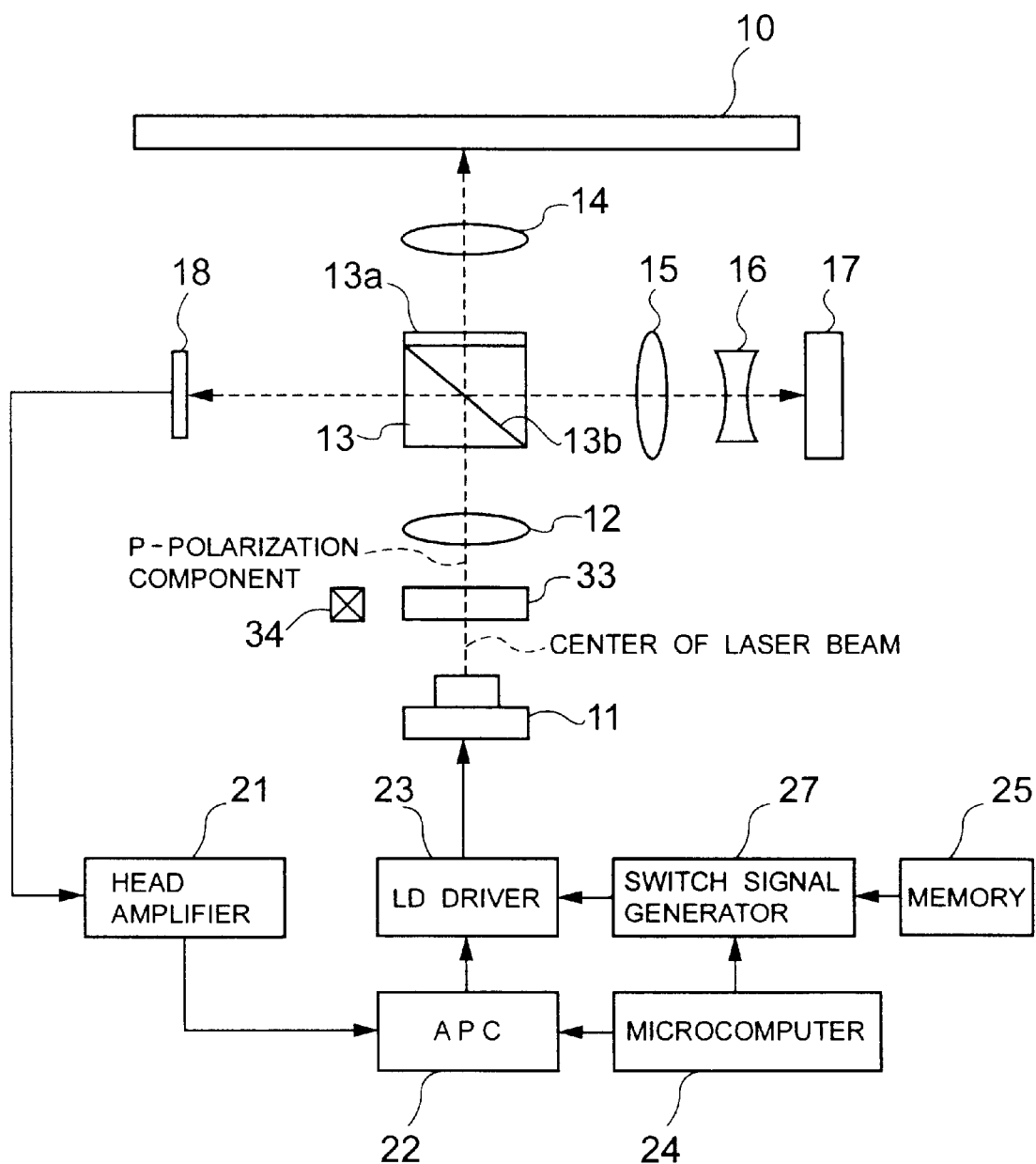
FIG. 4 is a diagram illustrating another embodiment of the present invention.

FIG. 4 shows still another embodiment of the present invention. In the optical pickup apparatus of this embodiment, a Faraday element 33 and an electromagnet 34 are provided instead of the polarizing plate 20 of the optical pickup apparatus in FIG. 1. The Faraday element 33 rotates the plane of polarization of a laser beam by an angle in proportion to the intensity of a magnetic field generated by the electromagnet 34. In this embodiment, when the plane of polarization of the laser beam rotates due to temperature fluctuations, the rotation is adjusted by rotating the plane of polarization in reverse by supplying a magnetic field corresponding to the angle of rotation from the electromagnet 34 to the Faraday element 33. This rotational adjustment of the plane of polarization by the Faraday element 33 is performed simultaneously with the above-mentioned APC. This operation improves the efficiency of the laser drive power compared with the embodiment shown in FIG. 1.

When the plane of polarization rotates due to temperature fluctuation, an adjustment example of the rotation by the Faraday element 33 will be specially described. In the case that a laser beam emitted from the semiconductor laser element 11 has a P-polarization component only, a second PBS (not shown) is provided between the collimator lens 12 and the PBS 13 to pass therethrough all the P-polarization component. The second PBS extracts an S-polarization component only in a direction which is different from the direction of the disc 10. The extracted S-polarization component is received by a photodetector (not shown). By controlling the Faraday element 33 by the electromagnet 34 so that the received S-polarization component approaches zero, it is possible to correct rotation of the polarization plate occurred due to temperature fluctuation.

Figure 5:
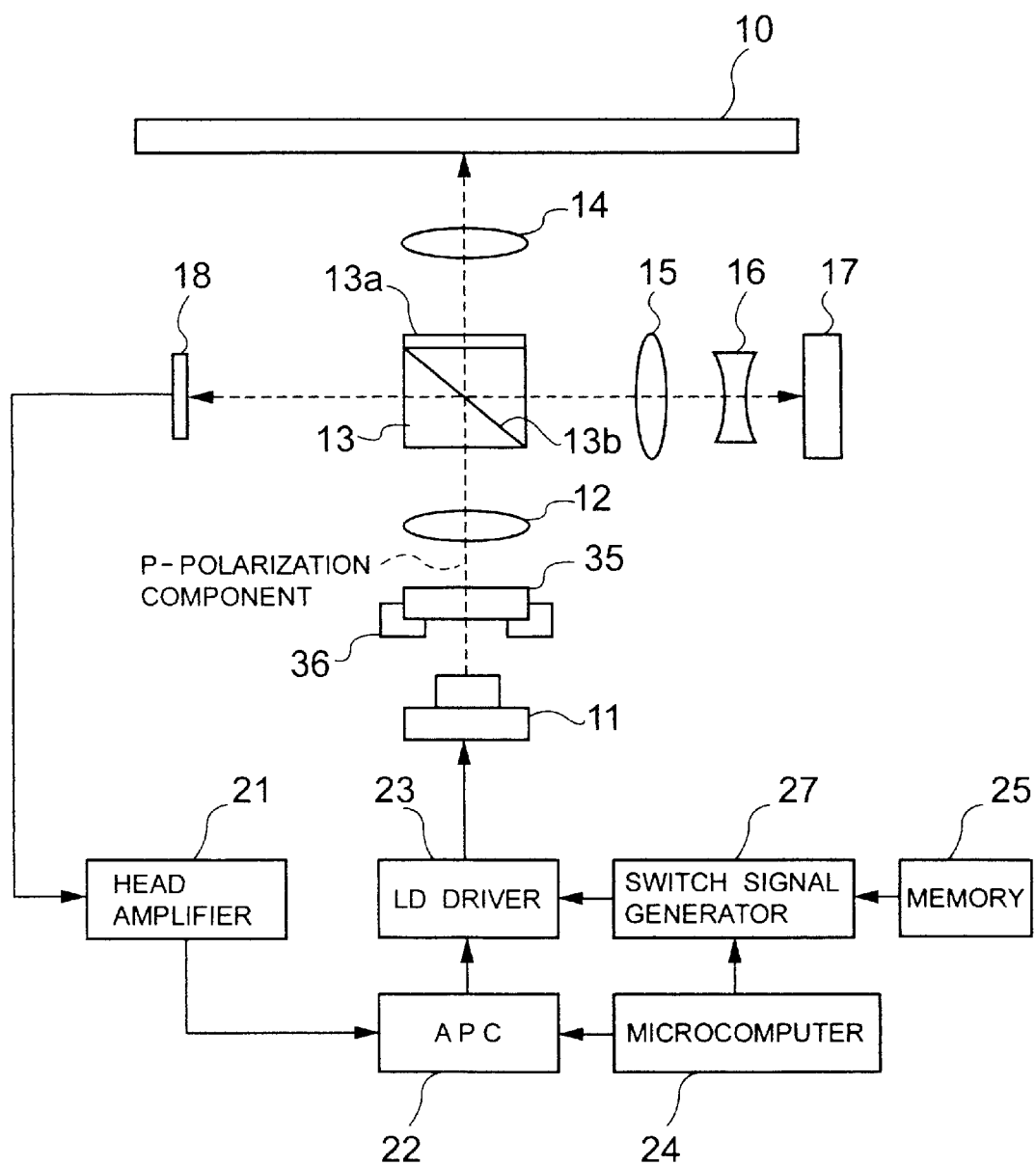
FIG. 5 is a diagram illustrating another embodiment of the present invention.

FIG. 5 shows still another embodiment of the present invention. In the optical pickup apparatus of this embodiment, instead of the polarizing plate 20 of the optical pickup apparatus in FIG. 1, a half-wave plate 35 and a rotational position adjusting mechanism 36 are employed. The rotational position adjusting mechanism 36 holds the half-wave plate 35 rotatably in a predetermined angular range $\Phi$ (0°<$\Phi$<45°) with respect to an optical axis. Therefore, the polarization direction of linear polarization of a laser beam emitted from the semiconductor laser element 11 can be adjusted. Accordingly, when the semiconductor laser 11 rotates from its initial position to a position at which the plane of polarization deviates from a normal position, the plane of polarization can be set to the desired rotational position by suitably adjusting the rotational position of the half-wave plate 35 at the time of assembling the optical pickup apparatus. Thus, as is shown in FIG. 1, it is possible to send the P-polarization component only to the collimator lens 12.

When the plane of polarization rotates due to temperature fluctuation, an adjustment example of the rotation by the half-wave plate 35 will be specially described. In a manner similar to the case of the Faraday element 33, an S-polarization component only is extracted. By controlling the half-wave plate 35 so that the S-polarization component approaches zero, it is possible to correct rotation of the polarization plate occurred due to temperature fluctuation.

In this embodiment, like the embodiment in FIG. 4, even if the plane of polarization of a laser beam emitted from the semiconductor laser 11 rotates because of temperature fluctuation, it is always possible to adjust the plane of polarization adequately any time with an additional actuator which can rotate the half-wave plate 35. A well-known means may be used as the actuator such as a pair of moving coil and magnet, an electromagnet, etc.

While the respective embodiments of the present invention have been described for a so-called infinite optical system which converts a laser beam emitted from a light source, which is divergent light, to collimated light by a collimator lens, the present invention is not limited to such specific embodiments, but can be applied to a finite optical system which omits the collimator lens and does not involve the conversion to collimated light.

As described above, according to the present invention, it is possible to stably control the optical intensity of a laser beam emitted from a light source by a simple configuration even if the plane of polarization of the laser beam rotates. It is also possible to stably perform read and write operations for a recording medium.

This application is based on Japanese Patent Applications No. 2000-304482 and No. 2000-384373 which are hereby incorporated by reference.

What is claimed is:

1. A laser light intensity controller for controlling a light intensity of a laser beam emitted from a light source of an optical apparatus, comprising:

a polarization separating device for passing therethrough a first portion of a first polarization component of the laser beam emitted from said light source and for reflecting a second portion of the first polarization component as monitoring light;

a light receiving device for receiving said monitoring light reflected by said polarization separating device to generate a light intensity signal indicative of the received light intensity;

a driving device for driving said light source in accordance with said light intensity signal; and an optical element arranged between said light source and said polarization separating device for passing the first polarization component and for cutting off a second polarization component, which is a component perpendicular to the first polaraization component, of the laser beam emitted from said light source.

2. A laser light intensity controller according to claim 1, further comprising a converting device disposed between said light source and said polarization separating device for converting the laser beam emitted from said light source to a collimated beam.

3. A laser light intensity controller according to claim 1, wherein said optical element is a flat glass plate of which an incident plane of the laser beam is inclined by the Brewster's angle.

4. A laser light intensity controller according to claim 1, wherein said optical element is a polarizing plate.

5. A laser light intensity controller according to claim 2, wherein said optical element is arranged in a direction in which the second polarization component is cut off between said light source and said converting device.

6. A laser light intensity controller according to claim, 2 wherein said optical element is a polarizing plate grating arranged between said converting device and said polarization separating device.

7. A laser light intensity controller according to claim 6, wherein said polarizing plate grating separates an incident laser beam and generates high order light for tracking servo control by the 3-beam method.

8. A laser light intensity controller according to claim 1, wherein said optical element is a Faraday element.

9. A laser light intensity controller according to claim 1, wherein said optical element is a half-wave plate.

10. A laser light intensity controller according to claim 2, wherein said converting device is a collimator lens.

11. A laser light intensity controller according to claim 1, wherein said polarization separating device is a polarizing beam splitter.

12. A laser light intensity controller according to claim 1, wherein said driving device drives said light source such that said first light intensity signal is at a reference level.

13. A laser light intensity controller according to claim 12, wherein said reference level is adjustable.

14. A laser light intensity controller according to claim 1, wherein the first polarization component is a P-polarization component, and the second polarization component is an S-polarization component.

15. A laser light intensity controller according to claim 1, wherein said optical element is a Faraday element which rotates the plane of polarization of said laser beam by an angle proportional to an intensity of a magnetic field provided.

* * * * *